(12) United States Patent
Ide (10) Patent No.: US 8,786,640 B2
(45) Date of Patent: Jul. 22, 2014

(54) INFORMATION DISPLAY DEVICE, MOVING DISTANCE DISPLAY METHOD AND MOVING DISTANCE DISPLAY PROGRAM

(75) Inventor: Akiko Ide, Tokyo (JP)

(73) Assignee: NEC Corporation, Tokyo (JP)

( * ) Notice: Subject to any disclaimer, the term of this patent is extended or adjusted under 35 U.S.C. 154(b) by 380 days.

(21) Appl. No.: 13/147,318

(22) PCT Filed: Feb. 1, 2010

(86) PCT No.: PCT/JP2010/000569
§ 371 (c)(1),
(2), (4) Date: Oct. 17, 2011

(87) PCT Pub. No.: WO2010/087204
PCT Pub. Date: Aug. 5, 2010

(65) Prior Publication Data
US 2012/0038680 A1 Feb. 16, 2012

(30) Foreign Application Priority Data
Feb. 2, 2009 (JP) .................................. 2009-021315

(51) Int. Cl.
G09G 5/24 (2006.01)
(52) U.S. Cl.
USPC ........................... 345/684; 345/441; 715/776
(58) Field of Classification Search
USPC .......................................... 345/684; 715/776
See application file for complete search history.

(56) References Cited

U.S. PATENT DOCUMENTS

| 5,392,387 A * | 2/1995 | Fitzpatrick et al. ........... 715/776 |
|---|---|---|
| 5,463,725 A * | 10/1995 | Henckel et al. ............... 715/776 |
| 5,467,102 A * | 11/1995 | Kuno et al. .................... 345/1.3 |
| 5,663,748 A * | 9/1997 | Huffman et al. ............... 345/173 |
| 6,266,057 B1 * | 7/2001 | Kuzunuki et al. ............. 715/745 |
| 6,278,443 B1 * | 8/2001 | Amro et al. .................... 345/173 |
| 6,407,757 B1 * | 6/2002 | Ho ................................ 715/776 |
| 7,134,072 B1 * | 11/2006 | Lovett et al. .................. 715/234 |
| 8,069,405 B1 * | 11/2011 | Bartz et al. .................... 715/205 |
| 2001/0024195 A1 * | 9/2001 | Hayakawa .................... 345/173 |
| 2002/0186252 A1 * | 12/2002 | Himmel et al. ............... 345/787 |
| 2004/0125081 A1 * | 7/2004 | Hayakawa .................... 345/156 |
| 2006/0184886 A1 * | 8/2006 | Chung et al. .................. 715/758 |
| 2013/0139101 A1 * | 5/2013 | Lira .............................. 715/784 |

FOREIGN PATENT DOCUMENTS

| JP | 9-244858 A | 9/1997 |
|---|---|---|
| JP | 11-45168 A | 2/1999 |
| JP | 2001-265481 A | 9/2001 |
| JP | 2007-264771 A | 10/2007 |

OTHER PUBLICATIONS

Kyosuke Nishiyama, et al., "Outline Zoom: User Interface for Browsing Large Collections of Data", Proceedings of the IEICE General Conference 2008, Mar. 2008, p. 295.

* cited by examiner

*Primary Examiner* — Javid A Amini
(74) *Attorney, Agent, or Firm* — Sughrue Mion, PLLC (57) ABSTRACT

Information display means displays information. Movement instruction detecting means detects an instruction to move the information displayed on the information display means. Number of moving regions calculating means calculates, based on the instruction, the number of moving regions, which is the amount of movement of the present invention displayed on the information display means. Movement indicator line determination means determines a movement indicator line, which is a predetermined line, according to the number of moving regions from a reference position that is used as reference when the information displayed on the information display means is moved. Movement display means displays the movement indicator line determined by the movement indicator line determination means on the information display means.

20 Claims, 8 Drawing Sheets

| FIRST TYPE |
|---|
| 1 LINE |
| 0.1cm |

| REFERENCE | LEFTWARD MOVEMENT | RIGHTWARD MOVEMENT | ONE REGION |
|---|---|---|---|
| LEFT END | LEFT KEY | RIGHT KEY | ONE SCREEN |

INFORMATION DISPLAY DEVICE, MOVING DISTANCE DISPLAY METHOD AND MOVING DISTANCE DISPLAY PROGRAM

CROSS REFERENCE TO RELATED APPLICATIONS

This application is a National Stage of International Application No. PCT/JP2010/000569, filed on Feb. 1, 2010, which claims priority from Japanese Patent Application No. 2009-021315, filed on Feb. 2, 2009, the contents of all of which are incorporated herein by reference in their entirety.

TECHNICAL FIELD

The present invention relates to an information display device, a moving distance display method, and a moving distance display program capable of visually recognizing the moving distance of browsing information.

BACKGROUND ART

With the advance of technology, users have been able to browse a larger amount of information than before. Moreover, with the improvement of graphic expression techniques, it has become possible to express information in various regions of various types and shapes such as, for example, a circle or a polygon as well as in a rectangular region.

As a first technique enabling users to browse a large amount of information, there is a technique that uses a scroll bar in which a bar region is provided in a part of a display region, and a scroll box is disposed within the bar region. The use of this type of scroll bar enables users to know the browsing position within the entirety of the information.

As a second technique, an information display method in which data is arranged along an axis without using a scroll bar, and users can freely change (enlarge or reduce) the scale of the axis is disclosed in NPL 1. In the information display method disclosed in NPL 1, a linear axis is set, and thumbnails are mapped onto the axis based on features to thereby visualize data distribution. In this case, data of which the features are similar are arranged to be distributed over a plurality of lines having different thumbnail sizes so that the thumbnails do not overlap each other. According to this arrangement, when a user changes (for example, expands the axis) the scale of the axis, thumbnails are moved from the lower lines so as to fill the gaps between open thumbnails to thereby maintain an appropriate display density.

As a third technique, a terminal in which it is possible to monitor portions which are not displayed without providing a scroll bar at an edge of a screen to thereby more effectively use a display region of a display portion is disclosed in PTL 1. The terminal disclosed in PTL 1 calculates the number of dots (a remaining image size) in the vertical direction of the portions which are not displayed on the display portion from the size of a displayed image and the display size of the display portion. Moreover, the terminal edits the screen so that a region (an area suggesting an image range) indicating the residual image size is displayed on the display portion based on the calculated residual image size.

CITATION LIST

Patent Literature

PTL 1: Japanese Patent Application Laid-Open No. 2007-264771 (Paragraphs 0020 and 0021, and FIG. 4)

Non Patent Literature

NPL 1: Nishiyama, Suzuki, and Senda, "Outline Zoom: User Interface For Browsing Large Collections of Data" Proceedings of the IEICE General Conference 2008, A-16-9, March 2008, Page 295

SUMMARY OF INVENTION

Technical Problem

All of the first to third techniques are just techniques which display a relative position of the displayed portion within the entirety of the information when a displayed portion within the entirety of the information is moved by the operation of a user (namely, when the displayed portion is changed). Thus, for example, when the user wants to return to a previously displayed portion, it is difficult to determine the moving distance, resulting in poor browsing efficiency.

Moreover, the first to third techniques are supposed to display the moving distance when information displayed in a rectangular region is moved. Thus, when information is displayed in a region of another shape (for example, circular, polygonal, and the like), it is not possible to determine the browsing position and the moving distance.

It is thereof an object of the present invention to provide an information display device, a moving distance display method, and a moving distance display program capable of clearly understanding the moving distance when information is displayed with the browsing position of the information moved.

Solution to Problem

An information display device according to the present invention comprises: information display means for displaying information; movement instruction detecting means for detecting an instruction for moving information displayed on the information display means; number of moving regions calculating means for calculating the number of moving regions which corresponds to a moving distance of the information displayed on the information display means based on the instruction; movement indicator line determination means for determining a movement indicator line which is a predetermined line in accordance with the number of moving regions from the reference position used as a reference when moving the information displayed on the information display means; and movement display means for displaying the movement indicator line determined by the movement indicator line determination means on the information display means.

A moving distance display method according to the present invention comprises: detecting an instruction for moving information displayed on the information display means for displaying information; calculating the number of moving regions which is a moving distance of the information displayed on the information display means based on the instruction; determining a movement indicator line which is a predetermined line in accordance with the number of moving regions from a reference position used as a reference when moving the information displayed on the information display means; and displaying the movement indicator line on the information display means.

A moving distance display program according to the present invention causes a computer to execute: a number of moving regions calculation process of detecting an instruction for moving information displayed on the information display means for displaying information and calculating a number of moving regions which is a moving distance of information displayed on the information display means based on the instruction; a movement indicator line determination process of determining a movement indicator line which is a predetermined line in accordance with the number of moving regions from a reference position used as a reference when moving the information displayed on the information display means; and a movement display process of displaying the movement indicator line determined in the movement indicator line determination process on the information display means.

Advantageous Effects of Invention

According to the present invention, it is possible to clearly understand the moving distance when information is displayed with the browsing position of the information moved.

DESCRIPTION OF EMBODIMENT

Hereinafter, exemplary embodiments of the present invention will be described.

First Exemplary Embodiment

Figure 1:
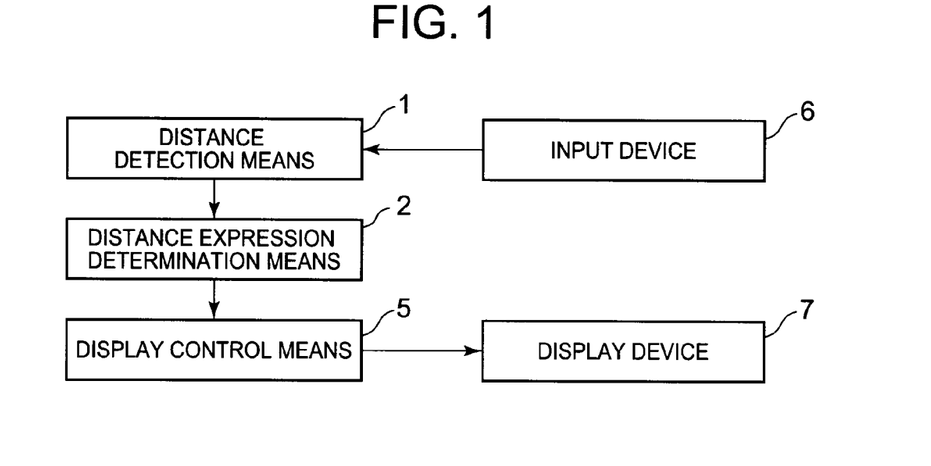
FIG. 1 is a block diagram illustrating an example of an information display device according to a first exemplary embodiment of the present invention.

FIG. 1 is a block diagram illustrating an example of an information display device according to a first exemplary embodiment of the present invention. An information display device according to the present exemplary embodiment includes distance detection means 1, distance expression determination means 2, display control means 5, an input device 6, and a display device 7.

The display device 7 is a device that displays selected information in accordance with an instruction by a user, for example. Although the display device 7 is realized by a display device such as, for example, a display device, the display device 7 is not limited to a display.

The input device 6 is a device that detects an instruction (hereinafter referred to as a movement instruction) for moving information displayed on the display device 7. The input device 6 may be a device having an input key such as, for example, a keyboard, a mobile device, or a remote control unit. In this case, the input device 6 may detect a movement instruction when a key provided in a keyboard, a mobile device, a remote control unit, or the like is pressed in accordance with an instruction by a user, for example. Alternatively, a mouse device may be used as the input device 6. In this case, the input device 6 may detect a movement instruction when a user operates a mouse, for example. Alternatively, a touch panel or the like may be used as the input device 6. In this case, the input device 6 may detect a movement instruction when the contact and operation of the fingers of a user is detected, for example. The input device 6 is not limited to the devices described above as long as it can detect a movement instruction.

The distance detection means 1 calculates a distance on a figure of information corresponding to the movement instruction based on the movement instruction from the user, for example. Here, the expression "on the figure of information" means the entirety of the information displayed on the display device 7. The expression "distance on the figure of information" means the moving distance of certain information within the entirety of the information to information that is desired to be displayed on the display device 7. That is, when a movement instruction from the user is detected, for example, the distance detection means 1 calculates the moving distance (hereinafter referred to as a number of moving regions) of information displayed on the display device 7 based on the movement instruction. In the following description, although a case in which the distance detection means 1 expresses the number of moving regions by an integer will be described as an example, the number of moving regions is not limited to the integer expression.

The distance expression determination means 2 determines a predetermined line (hereinafter referred to as a movement indicator line) in accordance with the number of moving regions from a position (hereinafter referred to as a reference position) serving as a reference when moving information displayed on the display device 7. In the present exemplary embodiment, a case in which a first movement indicator line (sometimes referred to as a first type of line) when the distance (number of moving regions) is 1, and a second movement indicator line (sometimes referred to as a second type of line) when the distance (number of moving regions) is a predetermined value greater than 1 will be described as an example. In this case, the distance expression determination means 2 determines a movement indicator line based on a combination of the first and second movement indicator lines in accordance with the number of moving regions from the reference position. Here, the reference position can be set to the end portion or the center of the entire displayed information. The reference position may be determined in advance in accordance with the shape of a display region.

Figure 2:
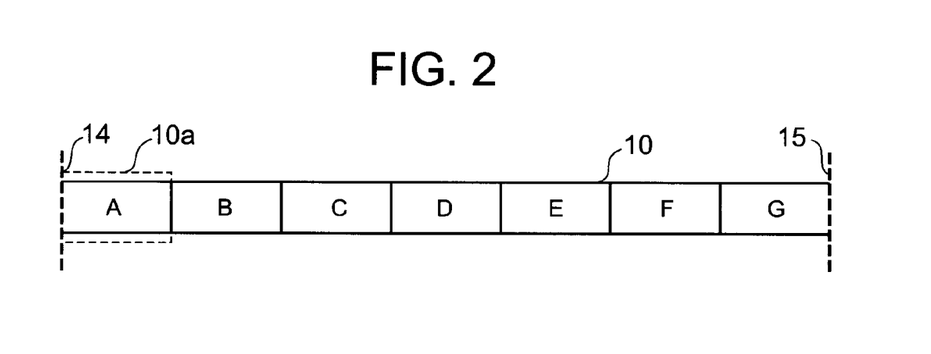
FIG. 2 is an explanatory diagram illustrating an example when an end portion of the entirety of the displayed information is determined as a reference position.

FIG. 2 is an explanatory diagram illustrating an example when an end portion of entire displayed information is determined as a reference position. In the example shown in FIG. 2, information is displayed in a rectangular display region 10a within the entirety of the information 10. In FIG. 2, a case where "A" is displayed within the entirety of the information 10 is shown. For example, when the left end is determined in advance as the reference position, a reference position 14 indicated by a broken line is the reference position. In addition, the right end may be determined as the reference position. In this case, a reference position 15 indicated by a broken line is the reference position. For example, the display device 7 may display information including the reference position as an initial state.

Figure 3:
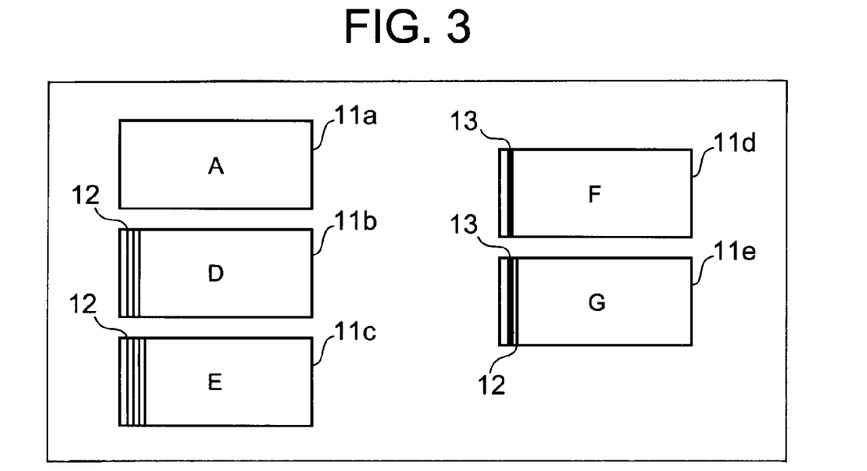
FIG. 3 is an explanatory diagram illustrating an example of a process of outputting a movement indicator line.

The display control means 5 displays the movement indicator line determined by the distance expression determination means 2 on the display device 7. FIG. 3 is an explanatory diagram illustrating an example of a process of displaying a movement indicator line on the display device 7. In the example shown in FIG. 3, it is assumed that a screen 11a is displayed on the display device 7 as an initial state. Moreover, a thin line 12 is used as a movement indicator line indicating a region in which the distance (namely, the number of moving regions) from the reference position is "1," and a thick line 13 is used as a movement indicator line indicating a region in which the distance from the reference position is "5". Moreover, when the left end is used as the reference position, and a leftward movement instruction is performed, information displayed on the display device 7 is moved by one screen, and a movement indicator line is displayed on the left side of the screen.

A screen 11b shows a state in which three leftward movement instructions are performed from the state of a screen 11a, and three thin lines 12 are displayed on the left side of the screen. In addition, for example, when the user presses a left key once (namely performs a movement instruction) to perform a leftward movement instruction, four leftward movement instructions are performed in total. In this case, the state of a screen 11c in which four thin lines 12 are displayed on the left side of the screen is obtained. In addition, for example, when the user presses a left key once to perform a leftward movement instruction, five leftward movement instructions are performed in total. In this case, the state of a screen 11d in which one thick line 13 is displayed on the left side of the screen rather than displaying five thin lines 12 is obtained. In addition, for example, when the user presses a left key once (namely performs a movement instruction) to perform a leftward movement instruction, six leftward movement instructions are performed in total. In this case, the state of a screen 11e in which one thick line 13 and one thin line 12 are displayed on the left side of the screen is obtained. As described above, since the movement indicator line is displayed in accordance with the number of movement instructions (namely, the number of moving regions moved by the movement instruction), it is possible to immediately understand how much a page has been moved, for example.

The distance detection means 1, the distance expression determination means 2, and the display control means 5 are realized by a CPU of a computer operating in accordance with a program (moving distance display program), for example. For example, the program may be stored in a storage unit (not shown) of an information display device, and the CPU may read the program and operate as the distance detection means 1, the distance expression determination means 2, and the display control means 5. Moreover, these respective means may be realized by other dedicated circuits.

Figure 4:
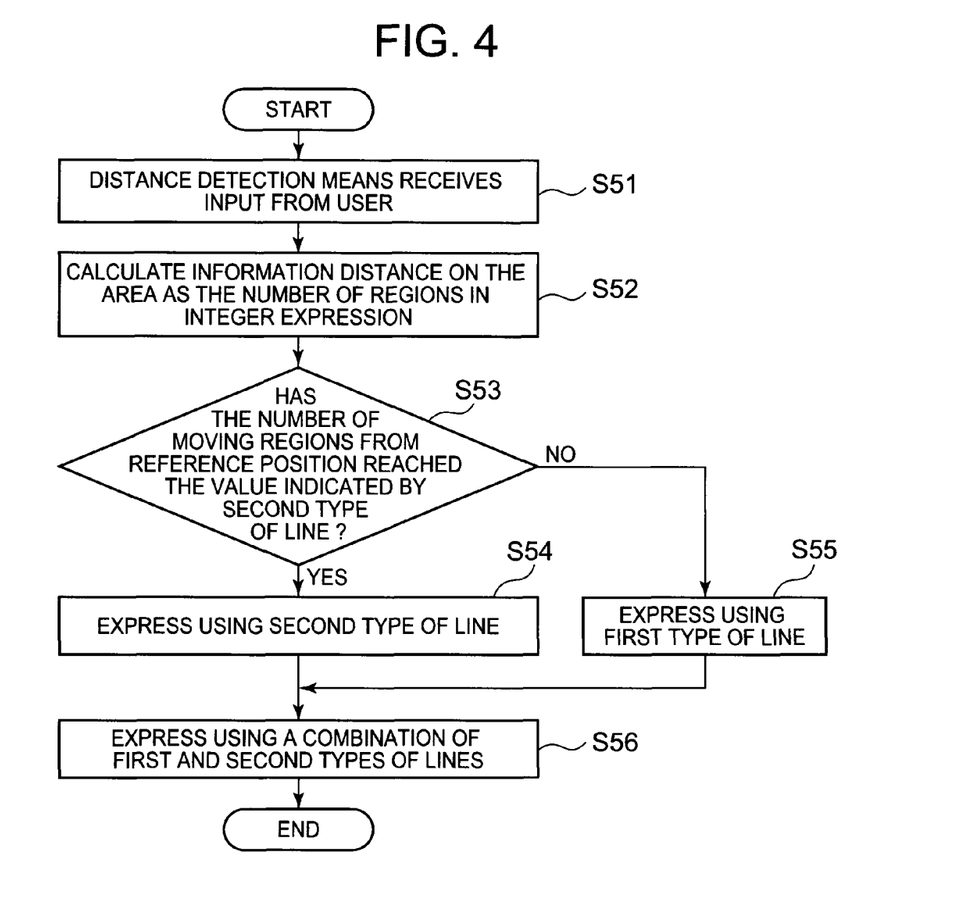
FIG. 4 is a flowchart illustrating an example of a process in the first exemplary embodiment.

Next, the operation will be described. FIG. 4 is a flowchart illustrating an example of a process in the first exemplary embodiment. For example, when the input device 6 detects a movement instruction from a user, the distance detection means 1 receives the input (step S51). Here, the input device 6 detects the movement instruction based on key input, mouse input, the input through a remote control unit or a mobile device, or a screen contact by the user. The distance detection means 1 calculates the distance (number of moving regions) on the figure of information corresponding to the movement instruction based on the movement instruction from the user in an integer expression (step S52). For example, a portion extending from the right end to the left end of the screen may be defined as one region, and a portion sandwiched between predetermined lines may be defined as one region. In this example, a case in which a portion extending from the right end to the left end of the screen is defined as one region will be described.

For example, when the input device 6 detects key input, and one key input results in movement of one region, the number of moving regions is "1". Moreover, for example, when the input device 6 detects mouse operation, and the mouse moves a distance from the right end to the left end of the screen, the number of moving regions is "1".

The distance expression determination means 2 determines whether the number of moving regions from the reference position has reached the value indicated by the second type of line (step S53). When the number of moving regions from the reference position has reached the value indicated by the second type of line (step S53: YES), the distance expression determination means 2 determines that the movement indicator line will be expressed using the second type of line (step S54). When the number of moving regions from the reference position has not reached the value indicated by the second type of line (step S53: NO), the distance expression determination means 2 determines that the movement indicator line will be expressed using the first type of line (step S55). The display control means 5 displays a movement indicator line expressed by the distance expression determination means 2 using a combination of the first and second types of lines on the display device 7 (step S56). Even when it is determined in step S55 that the first type of line will be used, if the number of moving regions has not reached the value indicated by the first type of line, the display control means 5 may display nothing on the display device 7.

In the above description, a case in which the first movement indicator line is used when the number of moving regions is 1, and the second movement indicator line is used when the number of moving regions is a predetermined value ("5" in the above description) greater than 1 has been described as an example. The number of types of lines being used is not limited to 2, but may be 1 and may be 3 or more. Moreover, the information display device may additionally include storage means (not shown; hereinafter referred to as movement indicator line storage means), and the movement indicator line storage means may store the number of moving regions and the type (for example, a line width or the like) of movement indicator lines in a correlated manner. In this case, the distance expression determination means 2 may select and determine the movement indicator line in accordance with the number of moving regions from the reference position from movement indicator lines indicated by the type stored in the movement indicator line storage means.

Figure 5:
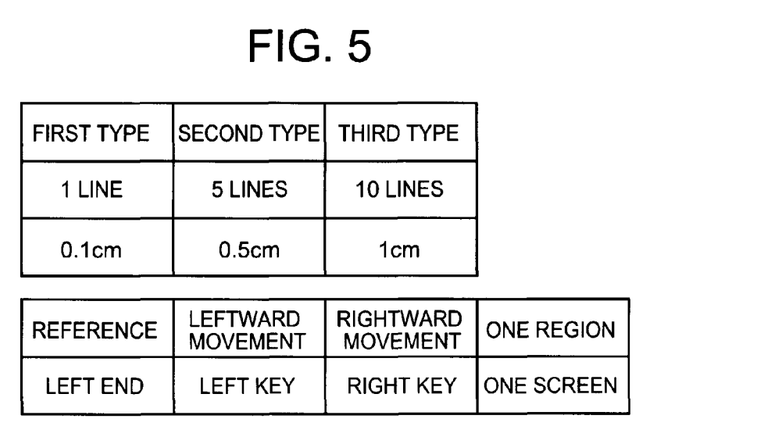
FIG. 5 is an explanatory diagram illustrating an example of information in which the number of moving regions and a movement indicator line are correlated with each other.

FIG. 5 is an explanatory diagram illustrating an example of information in which the number of moving regions and three types of movement indicator lines are correlated with each other. In the example shown in FIG. 5, the first type of line is used to display one amount (one region) and has a width of 0.1 cm, the second type of line is used to display five amounts (five regions) and has a width of 0.5 cm, and the third type of line is used to display 10 amounts (ten regions) and has a width of 1 cm. Moreover, in the example shown in FIG. 5, the reference position is defined at the left end, and one screen (namely, a portion extending from the right end to the left end of the screen) is defined as one region, and leftward and rightward movement instructions are detected based on the left and right keys, respectively. The information may be stored in the movement indicator line storage means. In addition, the reference position is not limited to the left end of the screen but may be set at the center of the screen.

A specific example of the operation of the first exemplary embodiment will be described. In the following description, a case in which the number of moving regions from the reference position is stored in a variable X, and the distance expression determination means 2 determines the movement indicator line based on the value of the variable X will be described. Here, the initial value of the variable X is 0. Moreover, it is assumed that the screen is in the state of the screen 11a shown in the example of FIG. 3. Furthermore, it is assumed that the number of moving regions and the movement indicator line have the relation shown in the example of FIG. 5. That is, the input device 6 detects the input of the left and right keys.

For example, when the input device 6 detects pressing of the left key once, the distance detection means 1 receives the input (step S51 in FIG. 4: the same applies to the following) and calculates the number of moving regions in the integer expression (step S52). In this case, the distance detection means 1 calculates the number of moving regions to be 1. The distance expression determination means 2 determines whether the sum of the number of moving regions calculated by the distance detection means 1 and the value of the variable X has reached the value (namely, "5") indicated by the second type of line (step S53). In this case, since the sum is 1, and the number of moving regions has not reached the value indicated by the second type of line (step S53: NO), the distance expression determination means 2 determines that the movement indicator line will be expressed using the first type of line (step S55). The display control means 5 displays the movement indicator line expressed by the first type of line on the display device 7 (step S56). In addition, the distance expression determination means 2 adds the number of moving regions (in this case, "1") to the variable X. The screen 11b shown in FIG. 3 is the state in which the input device 6 detects pressing of the left key twice. Moreover, the screen 11c shown in FIG. 3 is the state in which the input device 6 detects pressing of the left key once more in the state shown in the screen 11b. Here, the value of the variable X is 4 in the state shown in the screen 11c.

When the input device 6 detects pressing of the left key once more in this state, the distance detection means 1 receives the input (step S51 in FIG. 4: the same applies to the following) and calculates the number of moving regions in the integer expression (step S52). In this case, the distance detection means 1 calculates the number of moving regions to be 1. The distance expression determination means 2 determines whether the sum of the number of moving regions calculated by the distance detection means 1 and the value of the variable X has reached the value (namely, "5") indicated by the second type of line (step S53). In this case, since the sum is 5, and the number of moving regions has reached the value indicated by the second type of line (step S53: YES), the distance expression determination means 2 determines that the movement indicator line will be expressed using the second type of line (step S54). The display control means 5 displays the movement indicator line expressed by the second type of line on the display device 7 (step S56). This state is the screen 11d shown in FIG. 3, and the value of the variable X is 5.

When the input device 6 detects pressing of the left key once more in this state, the distance detection means 1 and the distance expression determination means 2 perform the processes of steps S51 to S53 in FIG. 4. In this case, since the sum is 6, and the number of moving regions has reached the value indicated by the second type of line (step S53: YES), the display control means 5 displays a movement indicator line expressed by a combination of the first and second types of lines on the display device 7 (step S56). This state is the screen 11e shown in FIG. 3, and the value of the variable X is 6.

Here, the input device 6 detects pressing of the right key once rather than the left key, the distance detection means 1 receives the input (step S51 in FIG. 4: the same applies to the following) and calculates the number of moving regions in the integer expression (step S52). In this case, the distance detection means 1 calculates the number of moving regions to be 1. The distance expression determination means 2 determines whether a value obtained by subtracting the number of moving regions calculated by the distance detection means 1 from the variable X has reached the value (namely, "5") indicated by the second type of line (step S53). In this case, since the subtracted value is 5, and the number of moving regions has reached the value indicated by the second type of line (step S53: YES), the distance expression determination means 2 determines that the movement indicator line will be expressed using the second type of line (step S54). The display control means 5 displays a movement indicator line expressed by the second type of line on the display device 7 (step S56). This state is the screen 11d shown in FIG. 3.

Although the left end has been described as the reference position, the reference position is not limited to this, and for example, the reference may be set to the right side and may be set to the upper or lower side. For example, when the reference is set to the right side, the display control means 5 may display the movement indicator line on the right side of the screen. Moreover, when the region is moved upward, the display control means 5 may display a line on the upper side.

Figure 6:
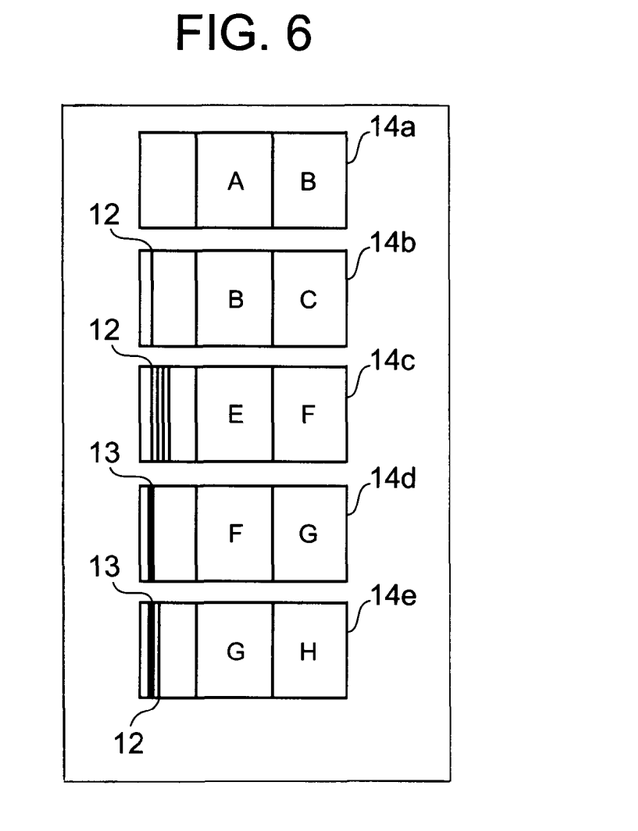
FIG. 6 is an explanatory diagram illustrating another example of a process of outputting the movement indicator line.

Another example of the operation of the first exemplary embodiment will be described. In the following description, a case in which a portion extending from the right end to the left end of the screen is not defined as one region will be described. FIG. 6 is an explanatory diagram illustrating another example of a process of outputting the movement indicator line. In the example shown in FIG. 6, the portion extending from the right end to the left end of the screen is not defined as one region, but for example, a portion (hereinafter referred to as a half screen) surrounding a region "A" or "B" shown in a screen 14a is defined as one region.

In the following description, a case in which the number of moving regions from the reference position is stored in a variable X, and the distance expression determination means 2 determines the movement indicator line based on the value of the variable X will be described. Here, the initial value of the variable X is 0. Moreover, it is assumed that the screen is in the state of the screen 14a shown in the example of FIG. 6. Moreover, it is assumed that the input device 6 detects the input of the left and right keys, and the half screen is moved leftward and rightward in accordance with the input of the left and right keys. Furthermore, it is assumed that the value indicated by the first type of line is 1, and the value indicated by the second type of line is 5.

For example, when the input device 6 detects pressing of the left key once, the distance detection means 1 receives the input (step S51 in FIG. 4: the same applies to the following) and calculates the number of moving regions in the integer expression (step S52). In this case, the distance detection means 1 calculates the number of moving regions to be 1. The distance expression determination means 2 determines whether the sum of the number of moving regions calculated by the distance detection means 1 and the value of the variable X has reached the value (namely, "5") indicated by the second type of line (step S53). In this case, since the sum is 1, and the number of moving regions has not reached the value indicated by the second type of line (step S53: NO), the distance expression determination means 2 determines that the movement indicator line will be expressed using the first type of line (step S55). The display control means 5 displays the movement indicator line expressed by the first type of line on the display device 7 (step S56). This state is a screen 14b shown in FIG. 6, and the value of the variable X is 1. When the input device 6 detects pressing of the left key three times in this state, the state of a screen 14c shown in FIG. 6 is obtained. Here, in this case, the value of the variable X is 4.

When the input device 6 detects pressing of the left key once more in this state, the distance detection means 1 and the distance expression determination means 2 perform the processes of steps S51 to S53 in FIG. 4. In this case, since the sum of the number of moving regions and the value of the variable X is 5, and the number of moving regions has reached the value indicated by the second type of line (step S53: YES), the display control means 5 displays a movement indicator line expressed by the second type of line on the display device 7 (step S56). This state is a screen 14d shown in FIG. 6, and the value of the variable X is 5.

When the input device 6 detects pressing of the left key once more in this state, the distance detection means 1 and the distance expression determination means 2 perform the processes of steps S51 to S53 in FIG. 4. In this case, since the sum of the number of moving regions and the value of the variable X is 6, and the number of moving regions has reached the value indicated by the second type of line (step S53: YES), the display control means 5 displays a movement indicator line expressed by a combination of the first and second types of lines on the display device 7 (step S56). This state is a screen 14e shown in FIG. 6, and the value of the variable X is 6.

Here, the input device 6 detects pressing of the right key once rather than the left key, the distance detection means 1 receives the input (step S51 in FIG. 4: the same applies to the following) and calculates the number of moving regions in the integer expression (step S52). In this case, the distance detection means 1 calculates the number of moving regions to be 1. The distance expression determination means 2 determines whether a value obtained by subtracting the number of moving regions calculated by the distance detection means 1 from the variable X has reached the value (namely, "5") indicated by the second type of line (step S53). In this case, since the subtracted value is 5, and the number of moving regions has reached the value indicated by the second type of line (step S53: YES), the distance expression determination means 2 determines that the movement indicator line will be expressed using the second type of line (step S54). The display control means 5 displays a movement indicator line expressed by the second type of line on the display device 7 (step S56). This state is the screen 14d shown in FIG. 6.

In the description of the present exemplary embodiment, a case in which, when the input device 6 detects a movement instruction from the user, the distance detection means 1 calculates the number of moving regions based on the instruction has been described. In addition to this, for example, if the information display device has a movement instruction unit (not shown) that performs a movement instruction periodically, the input device 6 may detect a movement instruction from the movement instruction unit.

Moreover, in the description of the present exemplary embodiment, although the movement indicator lines have been distinguished by the line width of the first and second types of lines, another distinguishing method may be used as long as these lines can be distinguished from each other. For example, the first and second types of lines may be distinguished by their colors.

Moreover, in the above description, although a case in which the reference position is defined as one end portion (for example, the left end) of the entire displayed information has been described, the reference position may not be one end portion. For example, the left and top ends of information (namely, the top left corner point) may be used as the reference position. In this case, the movement indicator line may be displayed on the left end of the screen when a leftward movement instruction is performed, and the movement indicator line may be displayed on the upper end of the screen when an upward movement instruction is performed.

According to the present invention, when the input device 6 detects a movement instruction to move information displayed on the display device 7, the distance detection means 1 calculates the number of moving regions of the information displayed on the display device 7 based on the instruction. Moreover, the distance expression determination means 2 determines a movement indicator line determined based on the number of moving regions from the reference position, and the display control means 5 displays the movement indicator line on the display device 7. Thus, it is possible to clearly understand the amount of movement when information is displayed with the browsing position of the information moved.

Second Exemplary Embodiment

Figure 7:
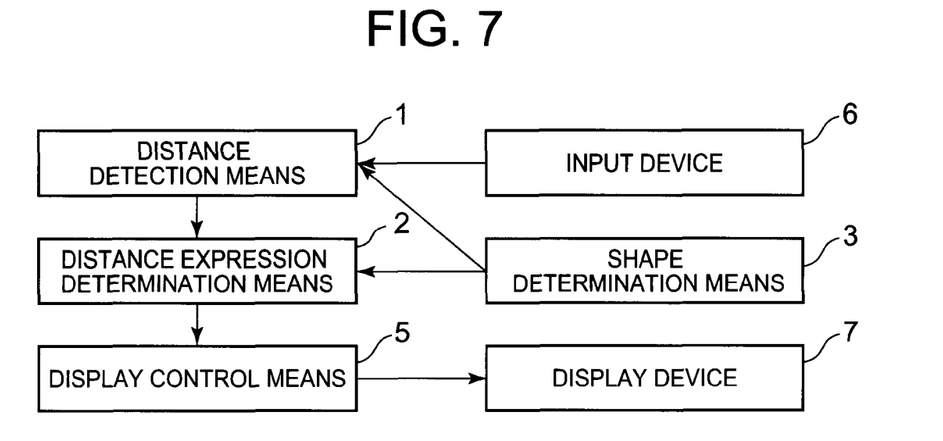
FIG. 7 is a block diagram illustrating an example of an information display device according to a second exemplary embodiment of the present invention.

FIG. 7 is a block diagram illustrating an example of an information display device according to a second exemplary embodiment of the present invention. The same configurations as the first exemplary embodiment will be denoted by the same reference numerals as FIG. 1, and description thereof will be omitted. The information display device according to the present exemplary embodiment includes the distance detection means 1, the distance expression determination means 2, the display control means 5, the input device 6, the display device 7, and shape determination means 3. The distance detection means 1, the distance expression determination means 2, the display control means 5, the input device 6, and the display device 7 have the same configurations as those of the first exemplary embodiment.

The shape determination means 3 determines the shape of a movement indicator line in accordance with the shape of a region (hereinafter sometimes referred to as a display region) to which the display device 7 outputs information. For example, the shape determination means 3 may determine a line surrounding a reduced region of the display region as the shape of the movement indicator line. However, the method of determining the shape of the movement indicator line is not limited to the above method. For example, the shape determination means 3 may store information of the movement indicator line corresponding to the shape of the display region in advance and determine the movement indicator line using the information. The display control means 5 displays a combination of movement indicator lines determined by the distance expression determination means 2 on the display device 7 in accordance with the shape of the movement indicator line determined by the shape determination means 3.

Figure 8:
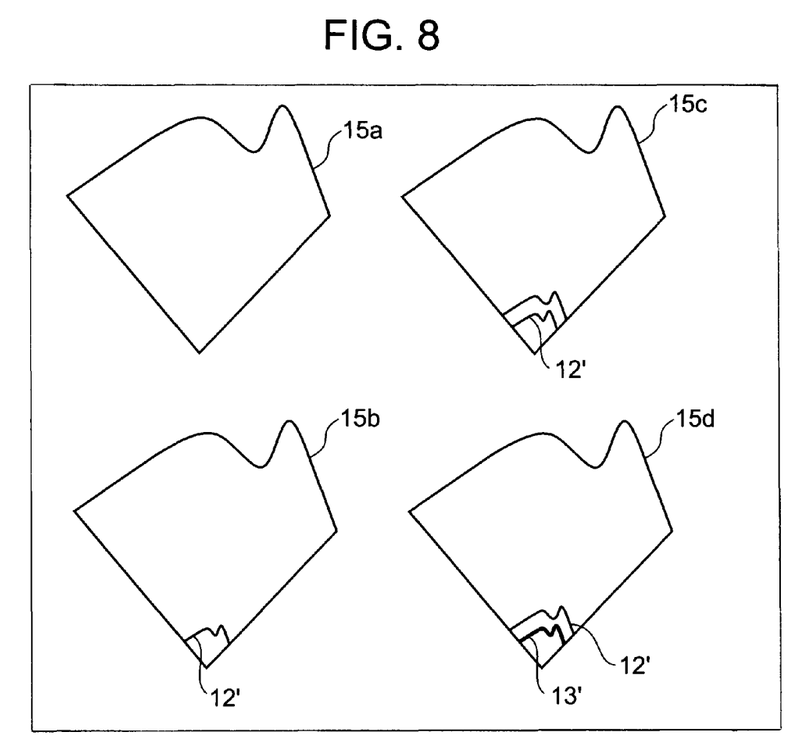
FIG. 8 is an explanatory diagram illustrating an example of the operation in the second exemplary embodiment.

FIG. 8 is an explanatory diagram illustrating an example of an operation of displaying a movement indicator line in accordance with the shape of a display device when the display device has a shape (namely, a shape other than a rectangular shape) surrounded by a straight line and a curve. The shape determination means 3 determines the shape of a thin line 12' and a thick line 13' in accordance with the shape of the display device. The display control means 5 displays the movement indicator line in accordance with the shape on the display device (namely, the display device 7). In the case of the example shown in FIG. 8, since the display device has the same shape as the display region, as a result, the movement indicator line is displayed in accordance with the shape of the display region. In the above description, although a case in which the movement indicator line is displayed in accordance with the shape of the display device is described, the display device may not have the same shape as the display region. For example, a display region having the same shape as a screen 15a may be provided on a rectangular display.

The distance detection means 1, the distance expression determination means 2, the shape determination means 3, and the display control means 5 are realized by a CPU of a computer operating in accordance with a program (moving distance display program), for example. For example, the program may be stored in a storage unit (not shown) of an information display device, and the CPU may read the program and operate as the distance detection means 1, the distance expression determination means 2, the shape determination means 3, and the display control means 5. Moreover, these respective means may be realized by other dedicated circuits.

Next, a process of displaying the movement indicator line determined by the shape determination means 3 will be described. In the following description, a case in which the input device 6 detects a movement instruction when a user operates a mouse in the vertical direction will be described. In addition, the input device 6 may detect the vertical movement instruction based on an operation on a touch panel.

Figure 9:
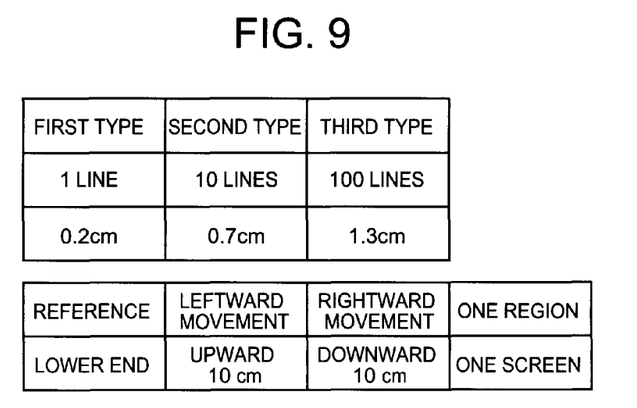
FIG. 9 is an explanatory diagram illustrating an example of information correlated with the number of moving regions and the movement indicator line.

FIG. 9 is an explanatory diagram illustrating an example of information in which the number of moving regions and three types of movement indicator line are correlated with each other. In the example shown in FIG. 9, the first type of line is used to display one amount (one region) and has a width of 0.2 cm, the second type of line is used to display ten amounts (ten regions) and has a width of 0.7 cm, and the third type of line is used to display 100 amounts (100 regions) and has a width of 1.3 cm. Moreover, in the example shown in FIG. 9, the reference position is defined at the lower end of the screen, and one screen (namely, a portion extending from the lower end of the screen to the upper end) is defined as one region. Moreover, upward and downward movement instructions are detected based on the upward and downward movement operations by a distance of 10 cm, respectively.

Moreover, in the following description, a case in which the number of moving regions from the reference position is stored in a variable X, and the distance expression determination means 2 determines the movement indicator line based on the value of the variable X will be described. Here, the initial value of the variable X is 0. Moreover, it is assumed that the screen is in the state of a screen 15a shown in the example of FIG. 8. Furthermore, it is assumed that the number of moving regions and the movement indicator line have the relation shown in the example of FIG. 9. That is, the input device 6 detects the movement operation in the vertical direction by a mouse.

For example, when the input device 6 detects a downward mouse operation by a distance of 10 cm, the distance detection means 1 receives the input (step S51 in FIG. 4: the same applies to the following) and calculates the number of moving regions in the integer expression (step S52). In this case, the distance detection means 1 calculates the number of moving regions to be 1. The distance expression determination means 2 determines whether the sum of the number of moving regions calculated by the distance detection means 1 and the value of the variable X has reached the value (namely, "10") indicated by the second type of line (step S53). In this case, since the sum is 1, and the number of moving regions has not reached the value indicated by the second type of line (step S53: NO), the distance expression determination means 2 determines that the movement indicator line will be expressed using the first type of line (step S55). The display control means 5 displays the movement indicator line expressed by the first type of line on the display device 7 in accordance with the shape of the movement indicator line determined by the shape determination means 3 (step S56). This state is a screen 15b shown in FIG. 8. In this case, information (for example, the second page) after the movement is displayed on the screen 15b.

In addition, the distance expression determination means 2 adds the number of moving regions ("1" in this example) to the variable X, and the value of the variable X is 1. When the input device 6 detects a downward mouse operation by a distance of 10 cm once more in this state, the state of a screen 15c shown in FIG. 8 is obtained. Here, in this case, the value of the variable X is 2. Moreover, when the input device 6 detects a downward mouse operation by a distance of 110 cm from the reference position, the state of a screen 15d shown in FIG. 8 is obtained.

Figure 10:
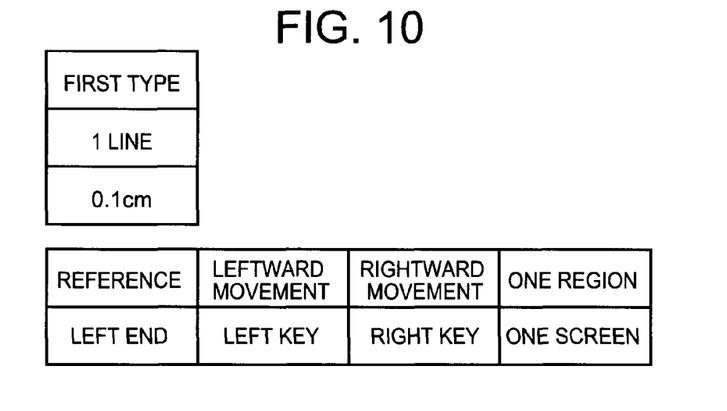
FIG. 10 is an explanatory diagram illustrating an example of information correlated with the number of moving regions and the movement indicator line.

In the above description, although a case in which the distance expression determination means 2 determines the movement indicator line by combining a plurality of types of movement indicator lines has been described as an example, as shown in the example of FIG. 10, for example, one type of information may be used as the information for correlating the number of moving regions with the movement indicator line.

Figure 11:
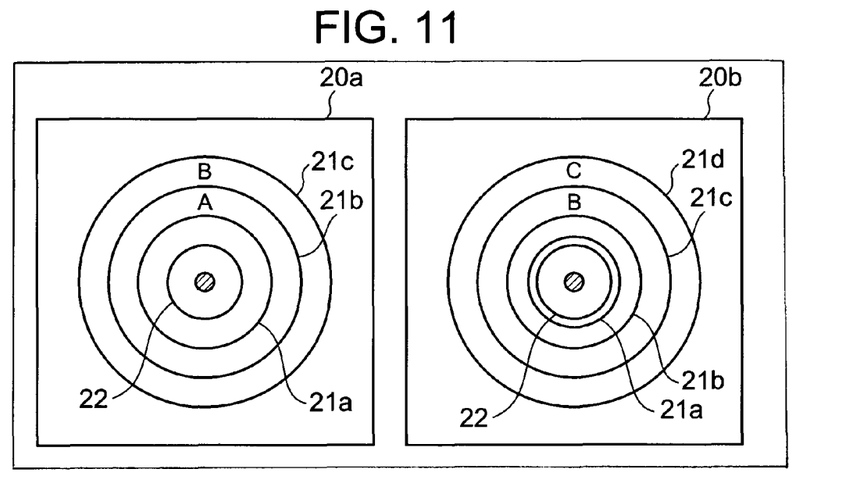
FIG. 11 is an explanatory diagram illustrating another specific example of the second exemplary embodiment.

FIG. 11 is an explanatory diagram illustrating another specific example of the second exemplary embodiment. In the example shown in FIG. 11, the display region has a shape that is surrounded by a circle. In this example, it is assumed that the region of displayed information expands toward the outer side of the circle from the center of the circle. In this case, for example, when the user performs an operation of moving the displayed information toward the center, the display control means 5 moves and displays information which has been present outside the circle and which was not visible. Moreover, in a screen 20a, lines 21a, 21b, and 21c form portions A and B. It is assumed that each of the portions A and B is a region which is moved by one movement operation of the user. Moreover, a reference line 22 is displayed inside the line 21a.

For example, when the user performs a movement instruction to move toward the center by a key operation in the state of the screen 20a, the lines 21a, 21b, and 21c and a line 21d which was not visible in the state of the screen 20a are moved toward the center, whereby the state of a screen 20b is obtained. That is, the lines 21b and 21c form smaller circles. In addition, the line 21a forms a circle which is reduced to be located near the reference line 22. By displaying such a line 21a, the line 21a serves as the movement indicator line. Thus, for example, when the user performs a movement operation toward the center, the display control means 5 may display the line 21a that forms a reduced circle near the center of the circle. In this way, by displaying the line 21a having the same shape as the display region so as to remain near the center of the circle, the user can immediately understand that the displayed information is moved toward the center once.

In the above description, although a case in which the displayed information region expands toward the outer side of the circle from the center of the circle has been described, the displayed information region may expand toward the inner side of the circle from the outer side of the circle. For example, when the user performs a movement operation toward the center in this state, the display control means 5 moves and displays information which has been present inside the circle and was not visible.

According to the present invention, the display control means 5 displays the movement indicator line determined by the distance expression determination means 2 in accordance with the shape determined by the shape determination means 3. Thus, it is possible to clearly understand the amount of movement of information in accordance with the shape of the region in which the browsing information is displayed in addition to the advantageous effects of the first exemplary embodiment.

Third Exemplary Embodiment

Figure 12:
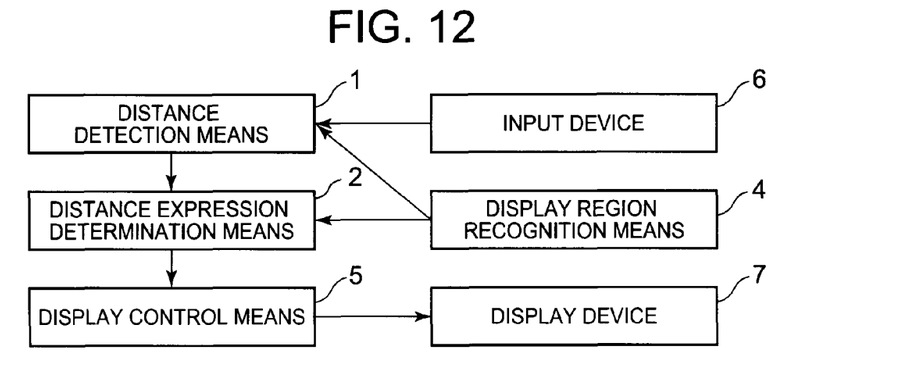
FIG. 12 is a block diagram illustrating an example of an information display device according to a third exemplary embodiment of the present invention.

In a third exemplary embodiment, a case in which there is a plurality of display regions will be described. FIG. 12 is a block diagram illustrating an example of an information display device according to the third exemplary embodiment of the present invention. The same configurations as the first exemplary embodiment will be denoted by the same reference numerals as FIG. 1, and description thereof will be omitted. The information display device according to the present exemplary embodiment includes the distance detection means 1, the distance expression determination means 2, the display control means 5, the input device 6, the display device 7, and display region recognition means 4. The distance detection means 1, the distance expression determination means 2, the display control means 5, the input device 6, and the display device 7 have the same configurations as those of the first exemplary embodiment.

The display region recognition means 4 recognizes a display region (hereinafter referred to as a selected region) selected from a plurality of display regions displayed on the display device 7. That is, the display region recognition means 4 recognizes a partial region of the screen. For example, when the key input detected by the input device 6 and the display region corresponding to the key are determined in advance, when the input device 6 detects key input, the display region recognition means may recognize the corresponding display region as a selected region. Alternatively, when the input device 6 detects a mouse operation, a display region selected by the mouse operation may be recognized as the selected region. That is, when the inner side of a line (hereinafter sometimes referred to as a screen region recognition line) surrounding a region is selected by a mouse operation, the display region recognition means 4 may recognize the selected region as a selected region. In addition, as long as the display region recognition means can recognize a display region selected from a plurality of display regions, the input device 6 is not limited to a key or a mouse, and the recognition method is not limited to the above method.

In addition, the information display device may include the display region recognition means 4 when there is one display region without being limited to the case when there is a plurality of display regions. In this case, the display region recognition means 4 may recognize the display region as a selected region in advance, and may recognize the display region as the selected region when the input device 6 detects an input.

When the selected region is recognized, the input device 6 may detect a movement instruction as an instruction for moving information displayed on the selected region. In this case, the distance detection means 1 calculates the number of moving regions of the information displayed in the selected region in response to the movement instruction. Moreover, the display control means 5 displays the movement indicator line determined by the distance expression determination means 2 in the selected region.

The distance detection means 1, the distance expression determination means 2, the display region recognition means 4, and the display control means 5 are realized by a CPU of a computer operating in accordance with a program (moving distance display program), for example. For example, the program may be stored in a storage unit (not shown) of an information display device, and the CPU may read the program and operate as the distance detection means 1, the distance expression determination means 2, the display region recognition means 4, and the display control means 5. Moreover, these respective means may be realized by other dedicated circuits.

Figure 13:
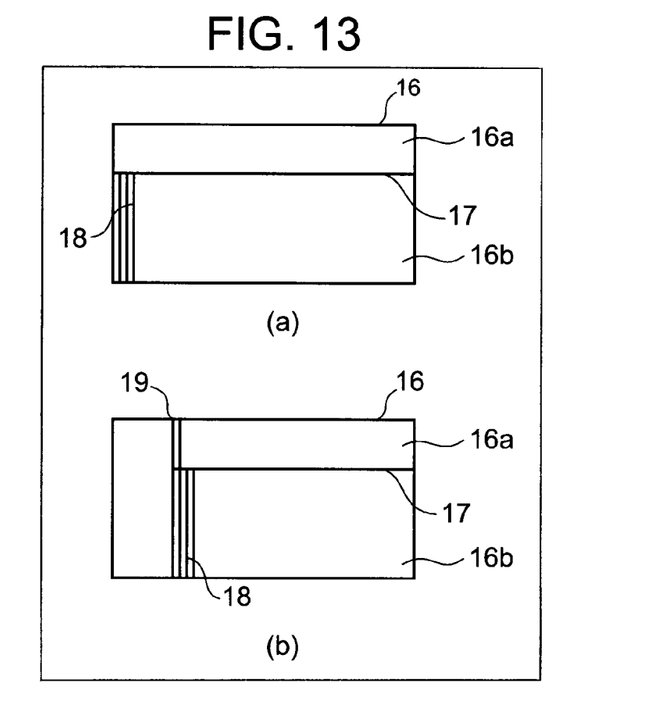
FIG. 13 is an explanatory diagram illustrating an example when there is a plurality of display regions.

FIGS. 13(a) and 13(b) are explanatory diagrams showing an example when there is a plurality of display regions. In the example shown in FIG. 13(a), a screen 16 is divided into two regions of upper and lower regions 16a and 16b by a screen region recognition line 17. For example, when the display region recognition means 4 recognizes the lower region 16b, the input device 6 determines a subsequent movement instruction to be a movement instruction with respect to the lower region 16b. Moreover, the display control means 6 displays the movement indicator line determined by the distance expression determination means 2 based on the number of moving regions calculated by the distance detection means 1 in the lower region 16b. In the example shown in FIG. 13(a), the displayed information is moved leftward by a distance of 3 regions in a state where the display region recognition means 4 recognizes the lower region 16b.

FIG. 13(b) is an explanatory diagram illustrating an example in which the position of a line 19 within the entire displayed information is determined as the reference position, and there is a plurality of display regions. In the example shown in FIG. 13(b), the reference position is at the position of the line 19. Moreover, the screen 16 is divided into two regions of the upper and lower regions 16a and 16b by the screen region recognition line 17. In the example shown in FIG. 13(b), the displayed information is moved leftward by a distance of one region in a state where the display region recognition means 4 recognizes the upper region 16a, and the displayed information is moved leftward by a distance of 3 regions in a state where the display region recognition means 4 recognizes the lower region 16b. Another display region may be present on the left side of the line 19. Alternatively, part of the two regions 16a and 16b when the display region recognition line 17 is extended to the left end may be present on the left side of the line 19.

According to the present invention, when the display region recognition means 4 recognizes a selected region selected from a plurality of regions displayed on the display device 7, the input device 6 determines a subsequent movement instruction to be a movement instruction with respect to the selected region. Moreover, the display control means 5 displays the movement indicator line determined by the distance expression determination means 2 based on the number of moving regions calculated by the distance detection means 1 in the selected region. Thus, the user can immediately understand how many times and which region has been operated even when the display region is divided in addition to the advantageous effects of the first and second exemplary embodiments.

Fourth Exemplary Embodiment

Figure 14:
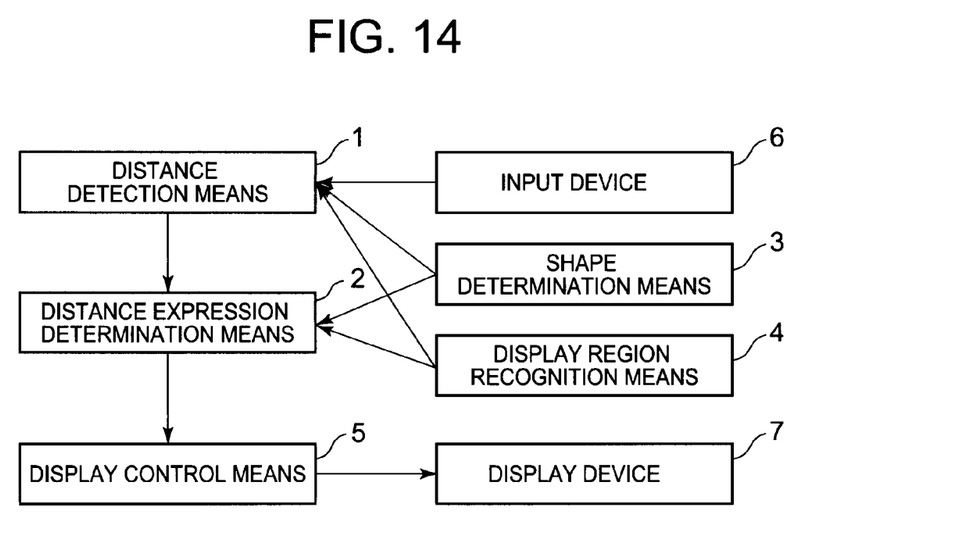
FIG. 14 is a block diagram illustrating an example of an information display device according to a fourth exemplary embodiment of the present invention.

FIG. 14 is a block diagram illustrating an example of an information display device according to a fourth exemplary embodiment of the present invention. The same configurations as the first, second, and third exemplary embodiments will be denoted by the same reference numerals as FIGS. 1, 7, and 12 and description thereof will be omitted. The information display device according to the present exemplary embodiment includes the distance detection means 1, the distance expression determination means 2, the display control means 5, the input device 6, the display device 7, the shape determination means 3, and the display region recognition means 4. The distance detection means 1, the distance expression determination means 2, the display control means 5, the input device 6, and the display device 7 have the same configurations as those of the first exemplary embodiment. Moreover, the shape determination means 3 has the same configuration as that of the second exemplary embodiment. Moreover, the display region recognition means 4 has the same configuration as that of the third embodiment. That is, the information display device of the fourth exemplary embodiment can be said to be the information display device of the first exemplary embodiment which includes the shape determination means 3 of the second exemplary embodiment and the display region recognition means 4 of the third exemplary embodiment.

Figure 15:
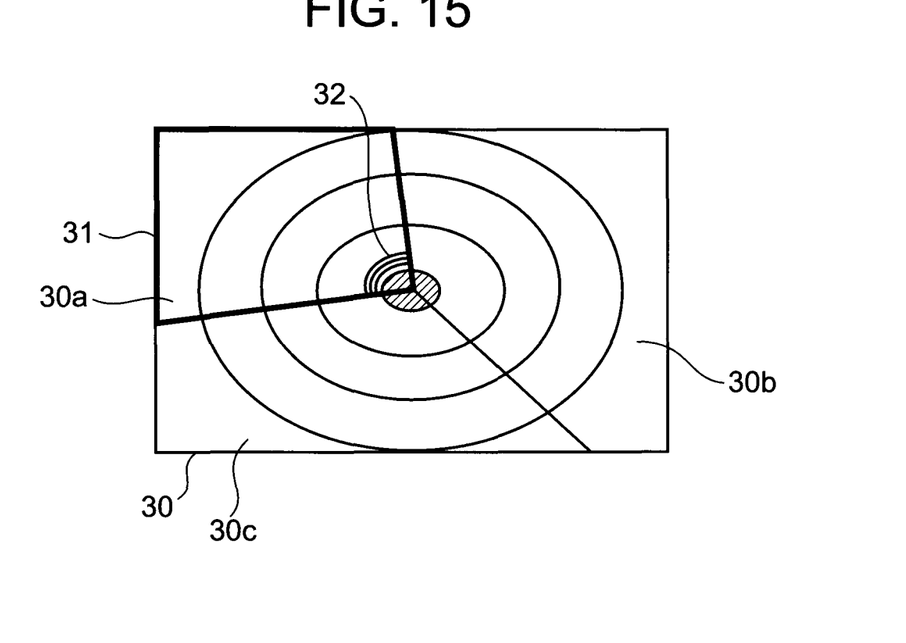
FIG. 15 is an explanatory diagram illustrating a specific example of the fourth exemplary embodiment.
Figure 16:
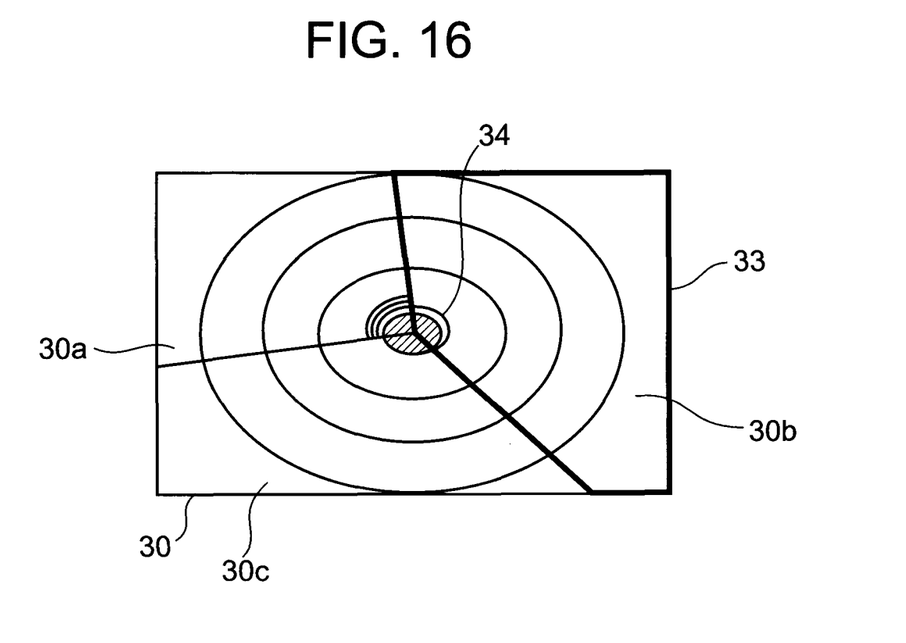
FIG. 16 is an explanatory diagram illustrating a specific example of the fourth exemplary embodiment.

FIGS. 15 and 16 are explanatory diagrams showing a specific example of the fourth exemplary embodiment. In the example shown in FIGS. 15 and 16, a screen 30 is divided into three regions 30a, 30b, and 30c. In the example shown in FIG. 15, the input device 6 detects a movement instruction to move displayed information toward the center three times in a state where the display region recognition means 4 recognizes a region 30a, and the shape determination means 3 determines the shape of the movement indicator line in accordance with the shape of the region 30a. In this state, when the display region recognition means 4 recognizes the region 30b, and the input device 6 detects the movement instruction toward the center once, the screen 30 enters a state shown in FIG. 16. Thus, even when the region is divided in such a manner, the user can immediately understand how many times and which region has been operated.

Figure 17:
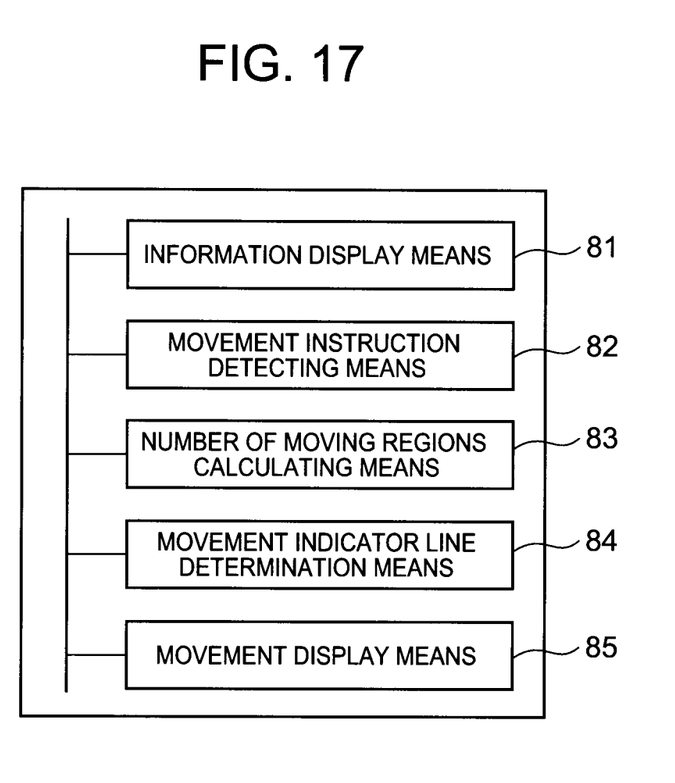
FIG. 17 is a block diagram illustrating a minimal configuration of an information display device according to the present invention.

FIG. 17 is a block diagram illustrating the minimal configuration of the information display device according to the present invention. The information display device according to the present invention includes: information display means 81 (for example, the display device 7) for displaying information; movement instruction detecting means 82 (for example, the input device 6) for detecting an instruction (for example, movement instruction) for moving information displayed on the information display means 81; number of moving regions calculating means 83 (for example, the distance detection means 1) for calculating a number of moving regions which is the amount of movement of the information displayed on the information display means 81 based on the instruction; movement indicator line determination means 84 (for example, the distance expression determination means 2) for determining a movement indicator line which is a predetermined line in accordance with the number of moving regions from a reference position used as a reference when moving the information displayed on the information display means 81; and movement display means 85 (for example, the display control means 5) for displaying the movement indicator line determined by the movement indicator line determination means 84 on the information display means 81.

With such a configuration, it is possible to clearly understand the amount of movement when information is displayed with the browsing position of the information moved.

Moreover, in the above exemplary embodiments, a configuration in which the information display device further comprises shape determination means (for example, the shape determination means 3) for determining the shape of the movement indicator line, and the movement display means 85 displays the movement indicator line (for example, the thin and thick lines 12 and 13 in FIG. 8) determined by the movement indicator line determination means 84 in accordance with the shape (for example, the shape of the screen 15a in FIG. 8) determined by the shape determination means is disclosed.

With such a configuration, it is possible to clearly understand the amount of movement of information in accordance with the shape of a region in which browsing information is displayed.

Moreover, in the above exemplary embodiments, a configuration in which the information display device further comprises screen region recognition means (for example, the display region recognition means 4) for recognizing a selected region which is a region selected from a plurality of regions (for example, the display regions) displayed on the information display means 81, the movement instruction detecting means 82 detects an instruction for moving the information displayed in the selected region, the number of moving regions calculating means 83 calculates the number of moving regions of the information displayed in the selected region in accordance with the instruction, and the movement display means 85 displays the movement indicator line determined by the movement indicator line determination means 84 in the selected region is disclosed.

Therefore, the user can immediately understand how many times and which region has been operated even when the selected region is divided.

Moreover, in the above exemplary embodiments, a configuration in which the information display device further includes movement indicator line storage means (for example, the movement indicator line storage means) for storing the number of moving regions and the type of movement indicator lines in a correlated manner (for example, as shown in FIG. 5), and the movement indicator line determination means 84 selects and determines a movement indicator line from movement indicator lines indicated by the type stored in the movement indicator line storage means in accordance with the number of moving regions from the reference position is disclosed.

Moreover, the movement indicator line determination means 84 may determine a movement indicator line based on a combination of a first movement indicator line (for example, the first type of line) determined in accordance with a first number of moving regions and a second movement indicator line (for example, the second type of line) determined in accordance with a second number of moving regions.

Moreover, the movement instruction detecting means 82 may detect the instruction for moving the information displayed on the information display means based on a key input, for example, using a mobile device or a remote control unit. Alternatively, the movement instruction detecting means 82 may detect the instruction for moving the information displayed on the information display means based on an input using a mouse.

Moreover, the information display device may further comprise detection means (for example, a touch panel) disposed on the information display means, for detecting contact and operation by fingers, and the movement instruction detecting means 82 may detect the instruction for moving the information displayed on the information display means by the detection means detecting contact and an operation by fingers.

While the present invention has been described with reference to exemplary embodiments and examples, the present invention is not limited to the exemplary embodiments and examples. It will be understood by one having ordinary skill in the art that the configuration and details of the present invention can be modified in various ways within the scope of the present invention.

This application is based on and claims the benefit of priority from Japanese Patent Application No. 2009-21315, filed on Feb. 2, 2009, the entire contents of which are incorporated herein by reference.

INDUSTRIAL APPLICABILITY

The present invention is ideally applied to an information display device capable of visually recognizing the amount of movement of browsing information.

REFERENCE SIGNS LIST

1: distance detection means
2: distance expression determination means
3: shape determination means
4: display region recognition means
5: display control means
6: input device
7: display device
10*a*: display region
12, 12': thin line (first type of line)
13, 13': thick line (second type of line)
14, 15: reference position
22: reference line

The invention claimed is:

1. An information display device, comprising:
an information display unit, configured to display information;
a movement instruction detecting unit configured to detect an instruction to move information displayed on the information display unit;
a number of moving regions calculating unit adapted to calculate the number, of moving regions, which is an amount of movement of the information displayed on the information display unit based on the instruction;
a movement indicator line determination unit configured to determine a movement indicator line which is a predetermined line, in accordance with the number of moving regions, from a reference position used as a reference when moving the information displayed on the information display unit;
a movement display unit configured to display the movement indicator line, determined by the movement indicator line determination unit, on the information display unit; and
a shape determination unit configured to determine a line surrounding a reduced region of the display region as the shape of the movement indicator line,
wherein the movement display unit is further configured to display the movement indicator line, determined by the movement indicator line determination unit, in accordance with the shape determined by the shape determination unit.

2. The information display device according to claim 1, wherein:
the shape determination unit determines the shape of the movement indicator line whose shape is the same as the display region, and
the movement display unit displays the movement indicator line determined by the movement indicator line determination unit in accordance with the shape determined by the shape determination unit.

3. The information display device according to claim 1, further comprising a screen region recognition unit which recognizes a selected region which is a region selected from a plurality of regions displayed on the information display unit,
wherein the movement instruction detecting unit detects an instruction for moving the information displayed in the selected region,
wherein the number of moving regions calculating unit calculates the number of moving regions of the information displayed in the selected region in accordance with the instruction, and
wherein the movement display unit displays the movement indicator line determined by the movement indicator line determination unit in the selected region.

4. The information display device according to claim 1, further comprising a movement indicator line storage unit which stores the number of moving regions and the type of movement indicator lines in a correlated manner,
wherein the movement indicator line determination unit selects and determines a movement indicator line from movement indicator lines indicated by the type stored in the movement indicator line storage unit in accordance with the number of moving regions from the reference position.

5. The information display device according to claim 1, wherein the movement indicator line determination unit determines a movement indicator line based on a combination of a first movement indicator line determined in accordance with the first number of moving regions and a second movement indicator line determined in accordance with a second number of moving regions.

6. The information display device according to claim 1, wherein the movement instruction detecting unit detects the instruction for moving the information displayed on the information display unit based on a key input.

7. The information display device according to claim 6, wherein the movement instruction detecting unit detects the instruction for moving the information displayed on the information display unit based on the key input using a mobile device.

8. The information display device according to claim 6, wherein the movement instruction detecting unit detects the instruction for moving the information displayed on the information display unit based on the key input using a remote control unit.

9. The information display device according to claim 1, wherein the movement instruction detecting unit detects the instruction for moving the information displayed on the information display unit based on an input using a mouse.

10. The information display device according to claim 1, further comprising a detection unit disposed on the information display unit, adapted to detect contact and operation by fingers, wherein the movement instruction detecting unit detects the instruction for moving the information displayed on the information display unit as a consequence of the detection unit detecting contact and operation by fingers.

11. A moving distance display method comprising:
detecting an instruction for moving information displayed on information display unit for displaying information;
calculating the number of moving regions which is an amount of movement of the information displayed on the information display unit based on the instruction;
determining a movement indicator line which is a predetermined line in accordance with the number of moving regions from a reference position used as a reference when moving the information displayed on the information display unit;
determining a line surrounding a reduced region of the display region as the shape of the movement indicator line; and
displaying the movement indicator line on the information display unit in accordance with the determined shape;
wherein at least one of the detecting, the calculating, the determining, and the displaying is performed using a microprocessor.

12. The moving distance display method according to claim 11, further comprising:
determining the shape of the movement indicator line whose shape is the same as the display region; and
displaying the movement indicator line on the information display unit in accordance with the determined shape.

13. The moving distance display method according to claim 11, further comprising:
recognizing a selected region which is a region selected from a plurality of regions displayed on the information display unit;
detecting an instruction for moving information displayed in the selected region;
calculating the number of moving regions of the information displayed in the selected region in accordance with the instruction; and
displaying the movement indicator line in the selected region.

14. The moving distance display method according to claim 11, further comprising selecting and determining the movement indicator line from movement indicator lines indicated by a type stored in movement indicator line storage unit for storing the number of moving regions from the reference position and the type of movement indicator lines in a correlated manner in accordance with the number of moving regions from the reference position.

15. The moving distance display method according to claim 11, further comprising determining a movement indicator line based on a combination of a first movement indicator line determined in accordance with a first number of moving regions and a second movement indicator line determined in accordance with a second number of moving regions.

16. A non-transitory computer readable information recording medium storing a moving distance display program that, when executed by a processor, performs a operations comprising
detecting an instruction for moving information displayed on information display unit for displaying information;
calculating the number of moving regions which is an amount of movement of information displayed on the information display unit based on the instruction;
determining a movement indicator line which is a predetermined line in accordance with the number of moving regions from a reference position used as a reference when moving the information displayed on the information display unit;
determining a line surrounding a reduced region of the display region as the shape of the movement indicator line; and
displaying the movement indicator line determined on the information display unit in accordance with the determined shape.

17. The non-transitory computer readable information recording medium according to claim 16, wherein the operations further comprise:
determining the shape of the movement indicator line whose shape is the same as the display region; and
displaying the movement indicator line on the information display unit in accordance with the determined shape.

18. The non-transitory computer readable information recording medium according to claim 16, wherein the operations further comprise:
recognizing a selected region which is a region selected from a plurality of regions displayed on the information display unit;
detecting an instruction for moving information displayed in the selected region;
calculating the number of moving regions of the information displayed in the selected region in accordance with the instruction; and
displaying the movement indicator line in the selected region.

19. The non-transitory computer readable information recording medium according to claim 16, werein the operations further comprise selecting and determining the movement indicator line from movement indicator lines indicated by a type stored in movement indicator line storage unit for storing the number of moving regions from the reference position and the type of movement indicator lines in a correlated manner in accordance with the number of moving regions from the reference position.

20. The non-transitory computer readable information recording medium according to claim 16, wherein the operations further comprise determining a movement indicator line based on a combination of a first movement indicator line determined in accordance with a first number of moving regions and a second movement indicator line determined in accordance with a second number of moving regions.

* * * * *

UNITED STATES PATENT AND TRADEMARK OFFICE
CERTIFICATE OF CORRECTION

PATENT NO. : 8,786,640 B2  Page 1 of 1
APPLICATION NO. : 13/147318
DATED : July 22, 2014
INVENTOR(S) : Ide It is certified that error appears in the above-identified patent and that said Letters Patent is hereby corrected as shown below:

In the Specification

Column 5, Line 46: Delete "screen lid" and insert -- screen 11d --

Column 5, Line 52: Delete "screen lie" and insert -- screen 11e --

Column 7, Line 48: Delete "screen lib" and insert -- screen 11b --

Column 8, Line 47: Delete "screen lid" and insert -- screen 11d --

Signed and Sealed this
Third Day of February, 2015

Michelle K. Lee
*Deputy Director of the United States Patent and Trademark Office*